(12) United States Patent
Jourdan et al.

(10) Patent No.: US 12,448,277 B2
(45) Date of Patent: Oct. 21, 2025

(54) MULTISENSOR MEMS AND/OR NEMS MEASUREMENT SYSTEM

(71) Applicant: COMMISSARIAT A L'ENERGIE ATOMIQUE ET AUX ENERGIES ALTERNATIVES, Paris (FR)

(72) Inventors: Guillaume Jourdan, Grenoble (FR); Sébastien Hentz, Grenoble (FR); Fabrice-Roland Lamberti, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 715 days.

(21) Appl. No.: 17/846,992

(22) Filed: Jun. 22, 2022

(65) Prior Publication Data

US 2022/0411257 A1    Dec. 29, 2022

(30) Foreign Application Priority Data

Jun. 25, 2021  (FR) ...................................... 2106811

(51) Int. Cl.
*B81B 7/02*   (2006.01)
*B81B 3/00*   (2006.01)
(Continued)

(52) U.S. Cl.
CPC .............. *B81B 3/0021* (2013.01); *B81B 7/02* (2013.01); *G02B 6/12009* (2013.01);
(Continued)

(58) Field of Classification Search
CPC . B81B 3/0021; B81B 7/02; B81B 2201/0271; B81B 2203/0118;
(Continued)

(56) References Cited

U.S. PATENT DOCUMENTS

2016/0246000 A1   8/2016  Duraffourg et al.
2017/0314973 A1*  11/2017  Leoncino ................. G01D 5/26
2019/0235446 A1*  8/2019  Trupke ....................... H01S 3/13

FOREIGN PATENT DOCUMENTS

EP    2 866 000 A1    4/2015
EP    3 244 169 A1    11/2017

OTHER PUBLICATIONS

Zhu, et al., "Integrated On-Chip Nano-Optomechanical Systems", International Journal of High Speed Electronics and Systems, vol. 26, No. 01n02, 1740005-1-22, 2017.
(Continued)

*Primary Examiner* — Peter J Macchiarolo
*Assistant Examiner* — John M Royston
(74) *Attorney, Agent, or Firm* — BakerHostetler

(57) ABSTRACT

A MEMs and/or NEMs measurement system includes a resonant assembly comprising: an input and an output, a plurality of N optical resonators Ri indexed i each having a resonance wavelength λr,i, at least one waveguide to which the optical resonators are coupled, at least one element coupled to each resonator Ri, an emission device, a modulation device, an injection device configured to superpose the N light beams to form an input beam and to inject the beam as input to the resonant assembly, at least one detector configured to detect a light beam arising from the beam at the output of the resonant assembly and to generate an output signal, a demodulation device comprising at least N synchronous-detection demodulation modules.

20 Claims, 10 Drawing Sheets

(51) Int. Cl.
- *G01D 5/26* (2006.01)
- *G01N 21/77* (2006.01)
- *G01P 15/093* (2006.01)
- *G01P 15/097* (2006.01)
- *G01V 8/20* (2006.01)
- *G02B 6/12* (2006.01)
- *G02B 6/293* (2006.01)

(52) U.S. Cl.
CPC .. *G02B 6/29395* (2013.01); *B81B 2201/0271* (2013.01); *B81B 2203/0118* (2013.01); *B81B 2203/0127* (2013.01); *G01D 5/268* (2013.01); *G01N 21/7746* (2013.01); *G01P 15/093* (2013.01); *G01P 15/097* (2013.01); *G01V 8/20* (2013.01); *G02B 2006/12097* (2013.01); *G02B 2006/121* (2013.01); *G02B 2006/12107* (2013.01); *G02B 2006/1214* (2013.01); *G02B 6/293* (2013.01); *G02B 6/29335* (2013.01)

(58) Field of Classification Search
CPC ........ B81B 2203/0127; G02B 6/12009; G02B 6/29395; G02B 6/293; G02B 2006/12097; G02B 2006/12107; G02B 2006/1214; G02B 6/29335; G02B 2006/121; G01N 21/7746; G01V 8/20; G01D 5/268; G01P 15/093; G01P 15/097; G01L 1/24
USPC .......................................................... 73/1.41
See application file for complete search history.

(56) References Cited

OTHER PUBLICATIONS

Westerveld et al. "Sensitive, small, broadband and scalable optomechanical ultrasound sensor in silicon photonics", Nature Photonics Letters, 2021.

Allain et al., "Optomechanical resonating probe for very high frequency sensing of atomic forces", Nanoscale, vol. 12, pp. 2939-2945, 2020.

* cited by examiner

MULTISENSOR MEMS AND/OR NEMS MEASUREMENT SYSTEM

CROSS-REFERENCE TO RELATED APPLICATION

This application claims priority to foreign French patent application No. FR 2106811, filed on Jun. 25, 2021, the disclosure of which is incorporated by reference in its entirety.

FIELD OF THE INVENTION

The present invention relates to the field of MEMS- or NEMS-based sensors, and more particularly to sensors using an optical resonator, for example coupled with another, typically mechanical element, and the placing of these sensors in arrays.

BACKGROUND

MEMS- or NEMS-based sensors based on the interaction of a quantity to be measured with an optical resonator have recently experienced substantial growth and are highly diverse in nature. What is understood by MEMS or NEMS sensor is any sensor making use of microelectronics microfabrication techniques.

A sensor of this type comprises an optical resonator RO, also called a photonic cavity, and one or more waveguides GO coupled to the optical resonator, as illustrated in FIG. 1. The optical resonator is characterized by at least one resonance wavelength $\lambda r$ associated with a resonance passband of width $\lambda r/Qopt$ (Qopt quality factor of the optical cavity) as illustrated in FIG. 2 which describes the energy E stored in the resonator as a function of the wavelength.

The propagation properties of the EM waves in the optical resonator are affected by a measurand u (physical quantity to be measured) or a parameter u whose response depends on a measurand of interest z. A read light beam Fin is injected as input to the sensor, and the amplitude and/or the phase of the light beam propagating through the one or more waveguides coupled to the optical resonator RO is disrupted by the quantity u. The optical transmission or reflection function of the sensor is thus modified, directly or indirectly, by the physical quantity to be measured. The beam Fout exits via the output of the sensor and is detected by a photodetector, and a measurement of the quantity u is deduced from the beam detected.

In the example of FIG. 1, the optical resonator RO is a ring whose effective index of propagation neff(u) depends on u for its real and/or imaginary part. The speed of propagation and/or the rate of dissipation of the light wave in the optical resonator thus depend on u.

For example, for a sensor intended to identify biological objects, the absorption of a biological or other body at the surface of the resonator modifies its effective index of propagation and changes the position of the resonance wavelength $\lambda r(u)$, u being the quantity absorbed. Based on the quantity absorbed, the nature of the body (measurand z) is determined.

Thus, the body absorbed is identified by the functionalization layer which selects the particles to be detected. To give an example of a measurand z in this sensor case, a relation may be established between the parameter u which corresponds to the quantity of material to be detected and the measurand z which may be the concentration of this material. The two are linked by an absorption-desorption process and may be described by a biochemical equilibrium equation.

More generally, detection is provided for by the presence of a functionalization layer arranged at the surface or close to (few hundreds of nm at most) the optical resonator. This layer:
may be identified as the element associated with the resonator
may be in the detection chain of the sensor
may be specific or non-specific to a given chemical or biological species. In this case, this specificity characteristic, potentially together with partial knowledge of the sample to be analysed (it is assumed that only objects A, B, C and D make up the input mixture and the layer primarily absorbs B), allows the object to be identified,
may be formed by a biological or chemical material added to the resonator or be integrated directly onto/into the resonator: the surface of the resonator or the interior of the resonator (porous material).

According to another example, the sensor comprises an optical resonator RO coupled with a mechanical element whose displacement is measured. This type of sensor is called an optomechanical sensor.

FIG. 3 illustrates such a sensor in which the mechanical element is a cantilever beam P secured at one end to a pad CP. The read beam is injected into the guide GO and recovered at the guide output by a grating coupler GC. The displacement x of the beam (parameter u) in the evanescent field of the optical resonator disrupts the effective index (variation in the "gap" between the beam and the ring). Based on the displacement x, the acceleration of a body (measurand z) is measured, for example.

According to another example, the optical resonator is coupled with a mechanical element resonant at the frequency frm. One example of an OMUS ("optomechanical ultrasound sensor") is described in the publication by Westerveld et al. "Sensitive, small, broadband and scalable optomechanical ultrasound sensor in silicon photonics", Nature Photonics Letters 2021 and illustrated in FIG. 4. The resonant mechanical element is a membrane Memb on a thin layer of silicon, Si slab, the vibration (resonance) of which is induced by an ultrasound UltraS wave to be measured when the frequency of the wave is close to the mechanical resonant frequency frm of the membrane. The membrane acts as a bandpass filter which selects the spectral components of the incident wave close to its resonant frequency. The membrane is arranged above a ring RO which is also made of silicon (coupled to the optical guide GO and arranged on a BOX substrate) at a distance denoted Gap (see a and b). The dark shading shows the strength of the electromagnetic field close to the optical resonator, the strength being higher in the region between the membrane and the resonator. The effective index of the resonator neff is modified by the value of the Gap (see c). As the membrane vibrates, the displacement x of the membrane varies the gap and therefore the effective index. The UltraS wave thus modifies the value of the resonance wavelength of the optical resonator. This shift in resonance wavelength is read by a laser emitting a light beam at a wavelength $\lambda 0$ located to a side of the resonance of the optical resonator (i.e. in the resonance passband of RO), which is injected into the waveguide. The light beam is detected at the guide output by a photodetector PD. The shift manifests as a variation in the transmission T of the sensor (ratio of the strengths) at the wavelength $\lambda 0$. The three curves of d correspond to various amplitudes of deflection of the membrane. Each curve corresponds to a position of the membrane. As the latter vibrates, there is a periodic transition from one curve to the other.

According to yet another example, the resonant mechanical element is merged with the optical resonator, which then has an optical resonance and a mechanical resonance.

All of the aforementioned sensors are referred to as active sensors, because these sensors use the energy provided by the measurand for transduction, and no external excitation is applied to the sensor: the force of the ultrasound wave activates the membrane, inertial force sets the mobile mass in motion, etc.

For another class of sensors, referred to as passive sensors, these sensors undergo modification of one of their physical parameters. For example, the resonant frequency of the mechanical system or its quality factor, the electrical resistance of a deformation gauge, etc. In this case, it is necessary to provide external excitation (a bias) to read this parameter. This excitation means is required for certain categories of sensor.

For example, the resonant mechanical element is excited at an external excitation frequency fex in the mechanical resonance band BPm around a mechanical resonant frequency frm.

Document EP3244169, and the publication by Diao et al. "Integrated on-chip nano-optomechanical systems" International Journal of High Speed Electronics and Systems; vol 26, no 1 & 2 (2017), describe the example of a beam placed in mechanical resonance by being actuated at an excitation frequency close to its resonance. Like in FIG. 3, the beam is located close to the optical resonator. The presence of an additional mass on the beam modifies the mechanical resonant frequency thereof. The measurement signal produced by the actuation allows the variations in resonant frequency δf to be extracted by virtue of the phase shift caused by the mechanical response with respect to the actuation signal. A gravimetric mass sensor is thus produced.

In another example of a passive sensor, the optical resonator and the mechanical resonator are merged. For example, it may be a vibrating disc exhibiting both optical and mechanical resonance: for example, a sensor operating in a liquid medium to detect biological objects (viruses, proteins, etc.) which is arranged on this disc. The additional mass absorbed on these discs is measured (a functionalization layer might or might not be used), which allows the concentration of the biological species to be inferred. The mass weighs the disc down, which modifies its mechanical resonant frequency. According to another example, this may be an atomic force sensor in the form of a ring provided with a point placed in resonance, such as described in the publication by Allain et al. "Optomechanical resonating probe for very high frequency sensing of atomic forces" Nanoscale, 2020, 12, 2939.

In order to multiply measurements and/or increase the precision or functionalities of the sensor, it is advantageous to place these active or passive sensors in an array.

Placing gravimetric mass sensors in an array affords significant advantages: increasing the mass-sensing area (higher measurement sensitivity), or the number of events detected,
different functionalizations for selecting species,
information on particle position: for example, in a chromatographic column, position is important information for locating biological/chemical species and measuring their respective quantities,
information redundancy to average the signal and increase resolution,
sensor redundancy to increase the robustness of the system. During use, components may deteriorate and no longer function correctly. This may be due to clogging despite flushing the system, mechanical breakage, etc. The system is then still able to operate, allowing its service life to be increased.

Placing ultrasound sensors in an array allows each sensor to act as a filter in being sensitive only to its frequency range. In addition, it is also possible to extract information on the direction of the ultrasound wave through the phase shift of the signal between the sensors.

There is then the problem of reading the information associated with each sensor.

In the aforementioned Westerveld publication, the reading of an assembly of sensors in an array takes place via wavelength-multiplexing/demultiplexing, by associating a wavelength with each sensor. The principle is illustrated in FIG. 5. The assembly of sensors is illustrated by resonators Ri whose effective index neff(ui) is modified by a measurand u (the mechanical element which may be present is not shown), which are coupled to one and the same waveguide. This mux/demux method is inspired by a standard procedure for mixing/separating signals for telecoms (WDM for wavelength multiplexing division). A multiplexer MUX mixes the beams emitted by the lasers Las1, Las2 . . . , at the wavelengths $\lambda 1, \lambda 2$ . . . , respectively. The mixed beams are conveyed to the array of sensors by an optical fibre OF1, and the wave Fin arising from the superposition of the various beams is injected into the waveguide GO. At the output of the sensor, the wave Fout is directed by an optical fibre OF2 to a demultiplexer DEMUX connected to photodetectors PD1, PD2 . . . each receiving a beam at a given wavelength.

This method has the following drawbacks:
need for multiplexing/demultiplexing optical components,
reconfiguration of the wavelengths of the mux/demux is not always possible: it is not easily adaptable to the system of sensors to be processed (variability in resonance wavelengths on manufacture),
muxes/demuxes often offer a regular wavelength pitch, which is not always suitable for optical resonators in which the variability in wavelength may be of the same order of magnitude (few nm) as the pitch of the mux/demux. It may be difficult to optimize the mux/demux array with the positions of the optical resonators.

Still in order to multiply the measurements, it is possible to position multiple elements per optical resonator. Document EP2866000 describes a gravimetric mass sensor formed of an assembly of four vibrating plates arranged above an optical ring, forming four sensors allowing more particle masses to be measured.

By extension, it is possible to arrange multiple optical resonators in arrays, each optical resonator being associated with multiple mechanical elements. Each optical resonator/associated element pair then forms a sensor. However, there is also the problem of accessing the information associated with each sensor.

SUMMARY OF THE INVENTION

An object of the present invention is to overcome the aforementioned drawbacks by providing a measurement system comprising multiple optical resonators coupled to at least one waveguide and, where applicable, multiple elements associated with an optical resonator, the measurement system allowing simultaneous recovery of the individual information from each optical resonator elementary sensor/element, and therefore access to all of the values measured by all of the sensors.

One subject of the present invention is a MEMs and/or NEMs measurement system comprising:
a resonant assembly comprising:
an input and an output,
a plurality of N optical resonators Ri indexed i each having a resonance wavelength λr,i,
at least one waveguide to which the optical resonators are coupled,
at least one element coupled to each resonator Ri and configured to modify an optical transmission or reflection close to the resonance of said optical resonator, said modification being dependent on a physical quantity to be measured,
an emission device configured to emit a plurality of N light beams each having an emission wavelength λi in the resonance band of the associated optical resonator, a modulation device configured to modulate each of the light beams at a modulation frequency fmod(i),
an injection device configured to superpose the N light beams to form an input beam (Bin) and to inject the beam as input to the resonant assembly,
at least one detector configured to detect a light beam arising from the beam at the output of the resonant assembly (Bout) and to generate an output signal (Sout),
a demodulation device comprising at least N synchronous-detection demodulation modules, denoted LIA, to demodulate the output signal, so as to extract characteristic signals associated with each element, measured values of said physical quantity being determined from said characteristic signals.

According to one embodiment the modulation device is arranged upstream of the injection device, the superposition of the N modulated light beams (Bmod(i)) forming the input beam.

According to one embodiment the emission device comprises N lasers and the modulation device comprises N modulators arranged respectively on the optical paths of the N light beams emitted by the N lasers, each modulator being configured to modulate the light beam associated with the frequency fmod(i).

According to one embodiment the modulators are electro-optical modulators.

According to one embodiment the emission device and the modulation device form one and the same device comprising N intensity-modulated lasers.

According to one embodiment an LIA demodulation module comprises a reference oscillator at a demodulation frequency and a first demodulation chain comprising a mixer and a low-pass filter. Preferably an LIA demodulation module comprises a second demodulation chain in quadrature with the first chain.

According to one embodiment the optical resonator is chosen from among: a disc, a guide looping back on itself, a photonic crystal.

According to a first variant a single element is associated with each optical resonator and the demodulation device comprises N LIA demodulation modules configured to perform N demodulations at said modulation frequencies fmod(i).

According to one embodiment at least one element Eij is resonant and has a characteristic frequency fc(i,j) in a resonance band of the resonant element Eij, j being the index of the element associated with the resonator Ri.

According to one embodiment a single element is associated with each optical resonator and the demodulation device comprises N LIA demodulation modules configured to perform, respectively, N demodulations at the frequencies fmod(i)+/−fc(i) when fc(i) is present and at the frequencies fmod(i) otherwise.

According to one embodiment a single element is associated with each optical resonator and the demodulation device comprises a first stage of N LIA demodulation modules (11) configured to perform, respectively, N demodulations at the frequencies fmod(i), and a second stage comprising either spectral filters configured to perform, for each channel i for which the frequency fc(i) is present, a spectral filtering around fc(i) to extract the associated characteristic signal, or LIA demodulators at the frequencies fc(i).

According to one embodiment the resonant element is merged with the optical resonator.

According to a second variant at least one optical resonator comprises a plurality of associated elements Eij comprising resonant elements, a resonator Ri comprising Mi associated elements, the resonant assembly comprising a total of M elements.

According to one embodiment the demodulation device comprises M LIA demodulation modules configured to perform, respectively, M demodulations at the frequencies fmod(i)+/−fc(i,j) when fc(i,j) is present and at the frequencies fmod(i) otherwise.

According to one embodiment the demodulation device comprises a first stage comprising N LIA demodulation modules configured to perform, respectively, N demodulations at the frequencies fmod(i) and comprises, for each channel i for which at least one characteristic frequency is present, a second stage comprising LIA demodulation modules (11) at the characteristic frequencies fc(i,j).

According to one embodiment the demodulation device comprises a first stage comprising N LIA demodulation modules configured to perform, respectively, N demodulations at the frequencies fmod(i) and comprises, for each channel i for which at least one characteristic frequency is present, a second stage comprising spectral filters (BPF) configured to perform spectral filtering around the characteristic frequency fc(i,j).

According to one embodiment the characteristic frequency is a natural vibration frequency caused by the physical quantity to be measured.

According to one embodiment the characteristic frequency is an external excitation frequency of said element.

According to another aspect the invention relates to a method for measuring a physical quantity (u) comprising the steps of:
A emitting a plurality of N light beams each having an emission wavelength λi,
B modulating each of the light beams at a modulation frequency fmod(i),
C superposing the N light beams to form an input beam and to inject the beam as input to the resonant assembly,
the resonant assembly comprising:
an input and an output,
a plurality of N optical resonators Ri indexed i each having a resonance wavelength λr,i, the wavelength λi being in the resonance band of the associated optical resonator Ri,
at least one waveguide (GO) to which the optical resonators are coupled,
at least one element positioned close to each resonator Ri, D modifying an optical transmission or reflection close to the resonance of each optical resonator, said modification being dependent on the physical quantity to be measured,
E detecting a light beam at the output of the resonant assembly and generating an output signal,
F synchronously demodulating the output signal, based on at least N synchronous-detection demodulation modules, so as to extract characteristic signals associated with each element, measured values of said physical quantity being determined from the characteristic signals.

The following description gives a number of exemplary embodiments of the device of the invention: these examples do not limit the scope of the invention. These exemplary embodiments not only have features that are essential to the invention but also additional features that are specific to the embodiments in question.

BRIEF DESCRIPTION OF THE DRAWINGS

The invention will be better understood and other features, aims and advantages thereof will become apparent from the detailed description which follows and with reference to the appended drawings, which are given by way of non-limiting examples and in which.

DETAILED DESCRIPTION

Figure 6:
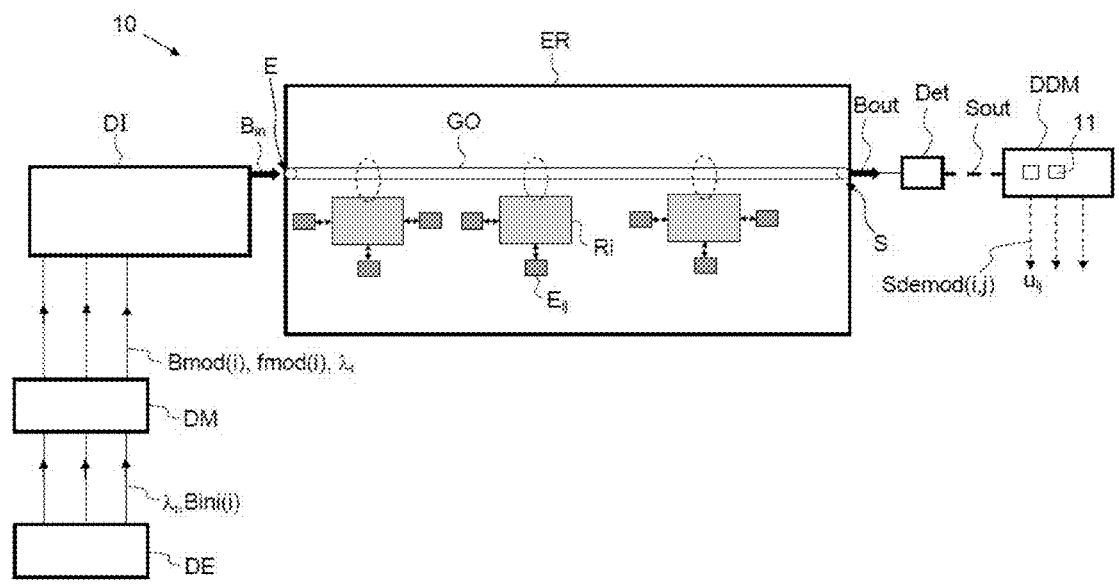
FIG. 6 illustrates a measurement system according to the invention.

The MEMs and/or NEMs measurement system 10 is illustrated in FIG. 6.

It first comprises a resonant assembly ER comprising an input E and an output S, a plurality of N optical resonators Ri indexed i each having a resonance wavelength $\lambda r,i$, and at least one waveguide GO to which the optical resonators are coupled.

The system 10 also comprises at least one element Eij coupled to each resonator Ri and configured to modify an optical transmission or reflection close to the resonance of the associated optical resonator Ri, the modification being dependent on a physical quantity to be measured. The optical resonators are indexed i varying from 1 to N, and the elements associated with a resonator i are indexed j: Eij. The number of elements associated with each resonator may be identical for all of the resonators (ease of manufacture and of reading) but this is not mandatory. An assembly Eij/Ri forms an elementary sensor Cij and the assembly ER forms an array of sensors. Within an assembly ER multiple types of sensors may be combined.

Some examples of resonators Ri are: a guide looping back on itself (such as a ring), a disc, a photonic crystal (periodic structuring of a dielectric element allowing confinement of light).

As explained above the optical transmission/reflection of a resonator Ri is modified by a physical quantity u, which may be either directly the final physical quantity that it is desired to measure or a parameter on which the final quantity to be measured z depends. The aim of the measurement system according to the invention is to measure the physical quantity u. Let uij denote the value of this parameter u measured by the element Eij associated with the resonator Ri (sensor Cij), and it is understood that when u is an intermediate parameter, the measurement zij is then determined from uij.

According to one embodiment the input and the output are located at two different sites, for example at the two ends of one and the same waveguide. According to another embodiment the input E and the output S are merged, for example in the case of a modification of the reflection.

According to one embodiment the resonators are arranged in series along a waveguide, but other embodiments with more complex arrangements are possible, combining resonators in series and/or in parallel. One example of a parallel arrangement is illustrated in FIG. 7 (GO1, GO2 and GO3 in parallel).

Figure 7:
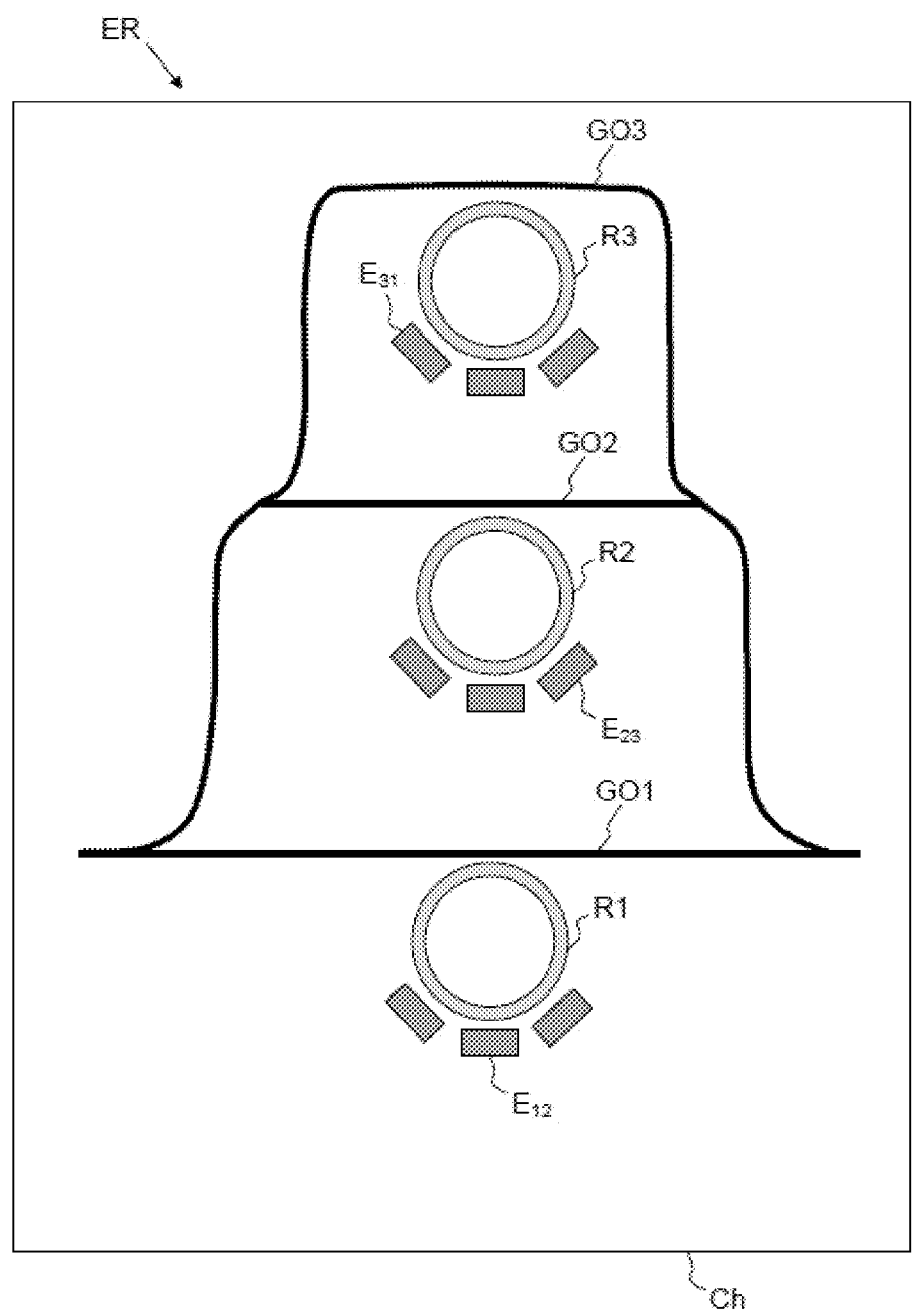
FIG. 7 illustrates a parallel arrangement of the optical resonators.

According to one embodiment also illustrated in FIG. 7 the resonant assembly ER of sensors in an array is produced on a chip Ch, for example made of silicon.

Figure 1:
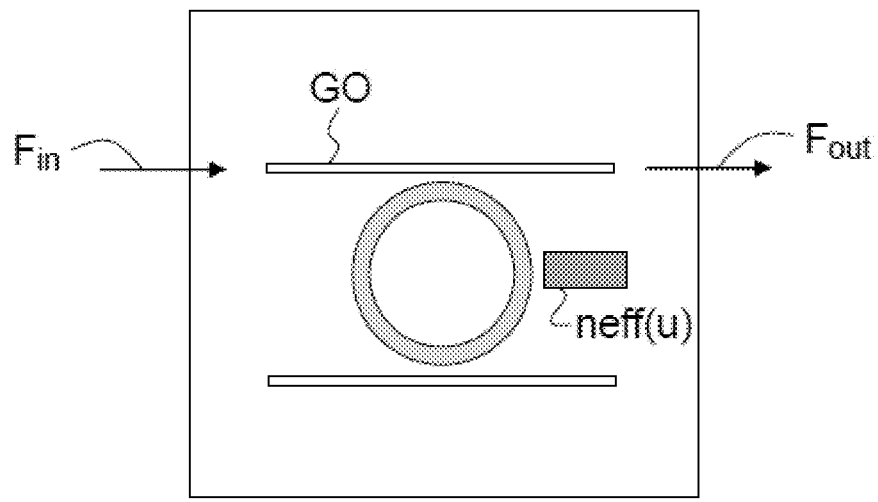
FIG. 1, already mentioned, illustrates one example of a sensor based on the modification of the effective index of an optical resonator.
Figure 2:
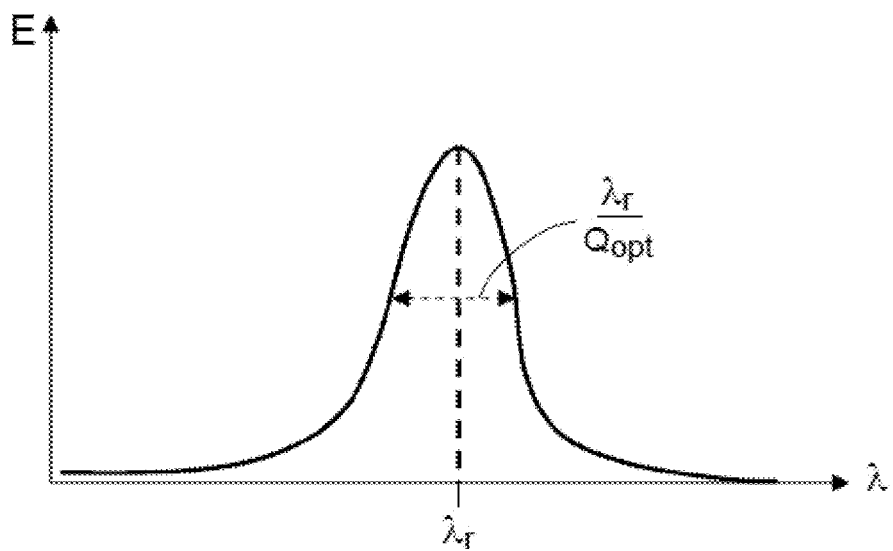
FIG. 2, already mentioned, illustrates the parameters of the resonance of an optical resonator.
Figure 3:
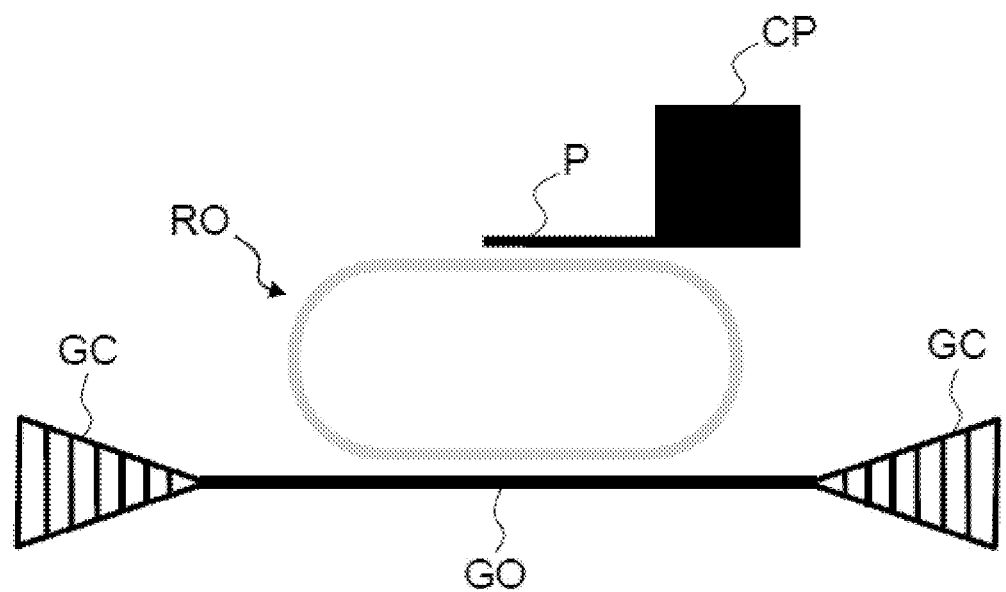
FIG. 3, already mentioned, illustrates one example of a sensor comprising a mechanical element coupled to the optical resonator.
Figure 4:
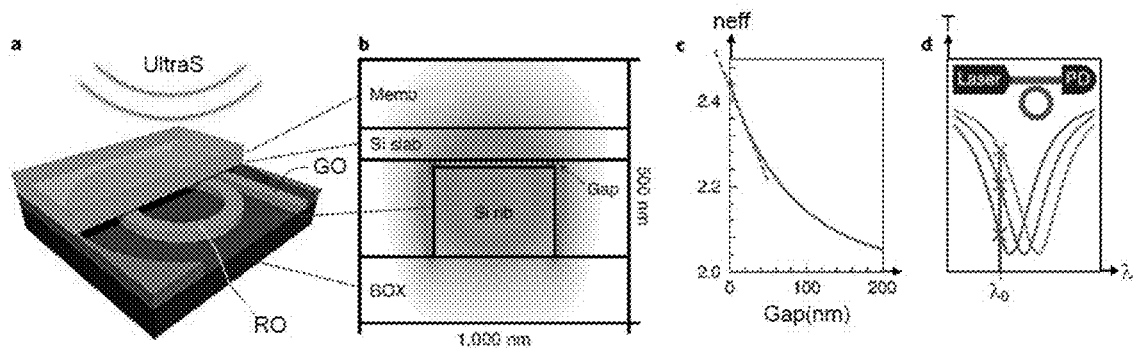
FIG. 4, already mentioned, illustrates one example of a sensor comprising a vibrating membrane coupled to the optical resonator.
Figure 5:
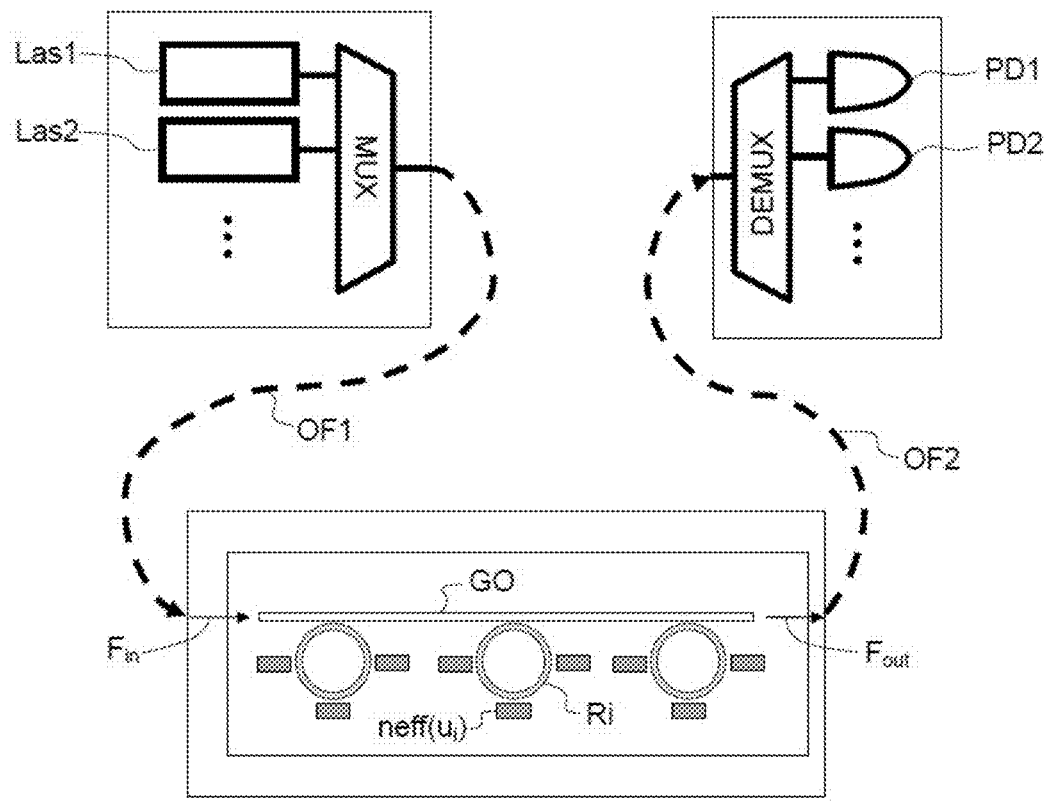
FIG. 5, already mentioned, illustrates the wavelength-multiplexing/demultiplexing method known to a person skilled in the art.

The measurement system 10 according to the invention also comprises an emission device DE configured to emit a plurality of N light beams each having an emission wavelength $\lambda i$ in the resonance band of the associated optical resonator Ri. The term "resonance spectral band" of the resonator Ri refers to the spectral band BPopt around the resonant frequency, characterized by the parameter Qopt as illustrated in FIG. 2: $BPopt=\lambda r/Qopt$.

The various wavelengths $\lambda i$ have to be chosen so as to have disjunct resonance spectral bands, to avoid a wavelength emitted by a laser being able to address two different ROs.

The system also comprises a modulation device DM configured to modulate each of the light beams at a modulation frequency fmod(i) and an injection device DI configured to superpose the N light beams to form an input beam Bin and to inject the beam as input to the resonant assembly ER. The input beam Bin is the probe, or read, beam which will read the measurements taken by the sensors Cij, via modification of the optical response of the resonators Ri. The output beam of the assembly ER is denoted Bout.

The beams are superposed using, for example, beam splitters, or a multiplexer known as an arrayed waveguide grating (AWG). Injection into the waveguide is performed, for example, using an optical fibre coupled to a diffraction grating (grating coupler) or by edge coupling, with an optical fibre positioned in the same plane as the substrate.

The system also comprises at least one detector Det, for example a photodiode, configured to detect a light beam arising from the output beam Bout, and to generate an electrical output signal Sout.

The devices DM and DI may be integrated onto one and the same chip, which may be different from or the same as the chip of the assembly ER. The detector Det may be integrated onto the chip Ch of the assembly ER where applicable.

In FIG. 6 and the following, optical beams are represented by solid lines and electrical signals by dashed lines, to aid in the legibility of the diagrams.

Preferably the modulation frequency fmod(i) of each beam is generated from a source oscillator Oscs(i).

According to one preferred variant the modulation device is arranged upstream of the input E of ER. Let Bmod(i) denote the modulated beams at the output of the device DM, and the superposition of the N modulated light beams Bmod(i) forms the input beam Bin.

According to a first embodiment of this first variant illustrated in FIG. 6 the device DM is arranged upstream of the device DI. According to a first option illustrated in FIG. 12 the emission device DE comprises N lasers Li emitting beams Bini(i) and the modulation device DM comprises N modulators Md(i) arranged respectively on the optical paths of the N light beams emitted by the N lasers, and configured to modulate each light beam at the frequency fmod(i). Preferably the modulators are electro-optical modulators EOM(i).

Figure 8:
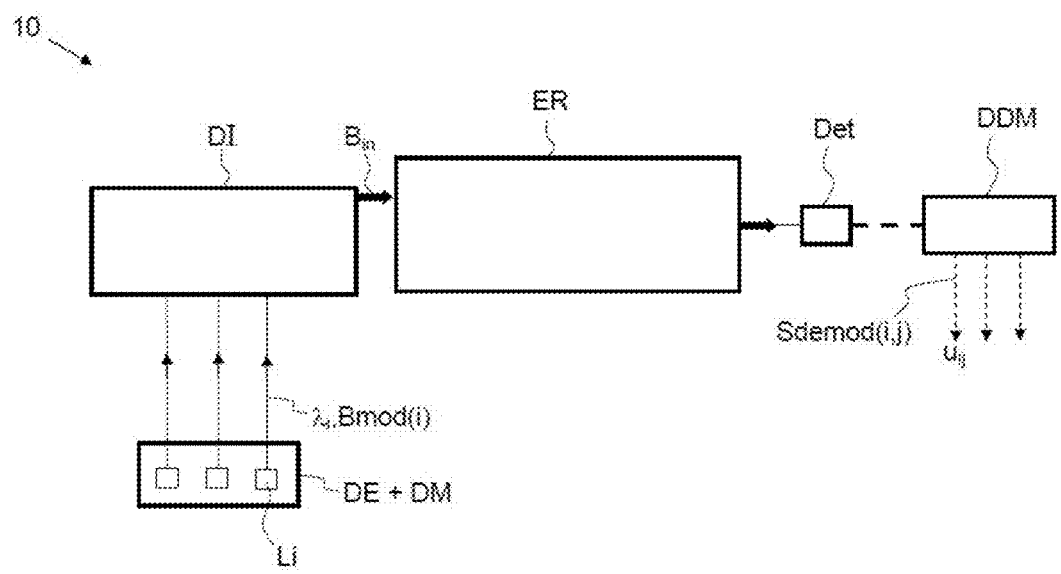
FIG. 8 illustrates one embodiment in which the emission device and the modulation device form one and the same device comprising N frequency-modulated lasers.

According to a second option illustrated in FIG. 8 the emission device DE and the modulation device DM form one and the same device comprising N frequency-modulated (amplitude modulation at a given frequency) lasers Li, for example laser diodes supplied with a modulated current. The device DM is then compact.

According to a second embodiment of the first variant, not shown, the device DM is arranged after the superposition of the beams, in the injection device.

Figure 9:
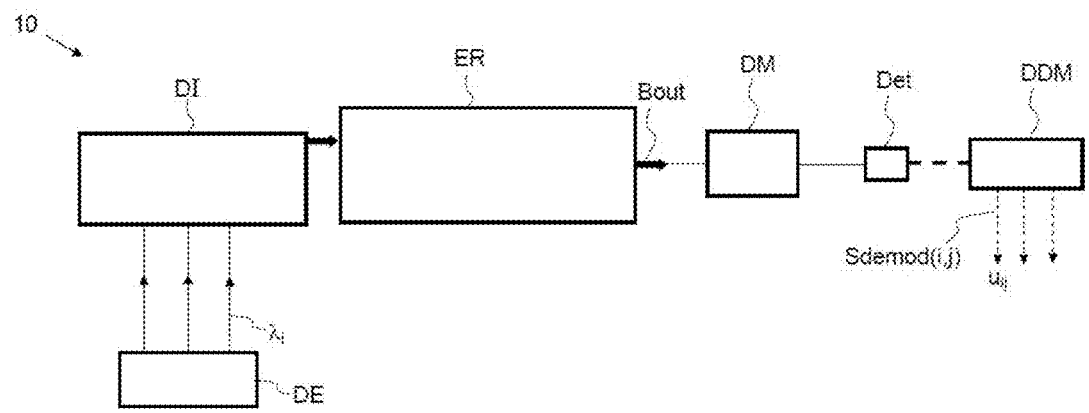
FIG. 9 illustrates one embodiment in which the modulation device is arranged downstream of the output of the assembly ER, before the detector.

According to a second variant illustrated in FIG. 9 the modulation device is arranged downstream of the output S of the assembly ER, before the detector Det.

According to one preferred embodiment the modulation device performs an intensity modulation. This intensity modulation takes place, for example, directly (modulated lasers), via absorption (electro-optical modulators), via Mach-Zehnder (MZ) interference or resonator interference. This last type of modulation is compatible for a positioning of DM downstream of the superposition before the input E of ER, or between the output of ER and the detector.

Figure 10:
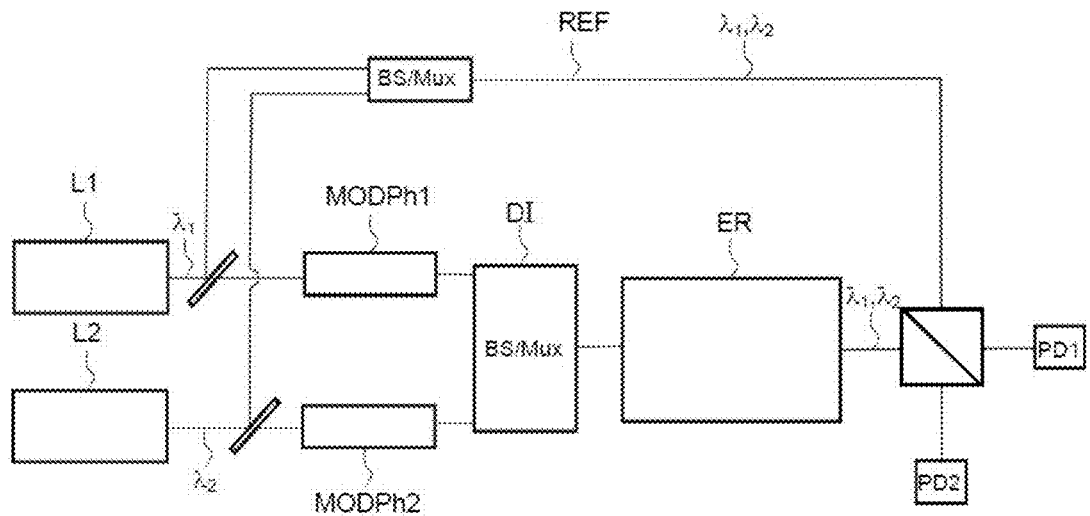
FIG. 10 illustrates one embodiment in which the intensity modulation is performed by a Mach-Zehnder interferometer.

Intensity modulation by a Mach-Zehnder MZ interferometer is a mixed method. The principle of the Mach-Zehnder modulator consists in splitting in two an initial beam which traverses two branches whose phase difference $\Delta\phi$ is controlled. At output two beams that are complementary in intensity are obtained using a splitter. The application to the measurement device according to the invention is illustrated in FIG. 10 for two wavelengths $\lambda 1$ and $\lambda 2$ generated by two lasers L1, L2, respectively. The phase of the optical wave of one of the branches of the interferometer is modulated, the assembly ER being arranged on one of the branches, with a phase modulator MODph1 for the beam at $\lambda 1$ and MODph2 for the beam at $\lambda 2$. In the example of FIG. 10 the assembly ER is arranged on the same branch as the phase modulators. When the phase-shifted beam is recombined with the reference beam REF, the phase modulation produces, for each optical beam at $\lambda i$, an intensity modulation. At output the signals of the complementary photodiodes PD1 and PD2 are measured. There is then produced a differential signal injected into the demodulation device. The advantage is to obtain a twofold gain in the output signal and to eliminate common disturbances, such as, for example, variations in laser intensity, static intensity, noise, etc. In addition, this configuration makes it possible to minimize the optical intensity modulation in the optical resonators. This intensity modulation may generate, through local thermal heating, a background signal coherent with the laser modulation.

Lastly, the system 10 comprises a demodulation device DDM comprising at least N synchronous-detection demodulation modules 11 to demodulate the output signal, so as to extract characteristic signals Sdemod(i,j) associated with each element Eij, the measured values uij of the physical quantity u being determined from the characteristic signals.

The principle of the system according to the invention is that the information relating to a wavelength $\lambda i$ is coded by frequency modulation at fmod(i), allowing this information to be recovered not by wavelength-demultiplexing but by synchronous-detection demodulation electronic processing. The signals at the frequencies of interest are extracted electronically with a very good signal-to-noise ratio. Extraction is performed by analogue or digital blocks.

The transmission function of the resonant assembly is determined:

$$tr(\lambda, u) = a_{out}/a_{in}$$

with ain amplitude of the beam Bin and aout amplitude of the beam Bout, for a given $\lambda$ (monochromatic beam).

At input the input optical wave $a_{in}$ is expressed as:

$$a_{in} = a_{in1} e^{-j\omega 1 t} + a_{in2} e^{-j\omega 2 t} + \ldots$$

With $\omega i = 2\pi C/\lambda i$ the angular frequency associated with $\lambda i$ (referenced in vacuum).

At output, in practice just one optical intensity $I_{out} = |a_{out}|^2$ is measurable. Of interest are small variations in the parameter u. The transmission function may be linearized:

$$t_r(\lambda_i, u_{ij}) = t_{r0}(\lambda_{i0}) \cdot (1 + \alpha_{ij} \cdot u_{ij}) \quad (1)$$

With $\alpha_{ij}$ complex number, $u_{ij}$ value of u measured by the sensor Cij and $\alpha_i$.

For the resonant sensors, an excitation signal is applied to the sensor at $\Omega ij$:

$u_{ij} = u_{ij0}(z) \cdot \cos(\Omega_{ij} t + \phi_{ij}(z))$ with z measurand of interest, and $\Omega ij$ characteristic angular frequency:

$$\Omega_{ij} = 2 \cdot \pi \cdot fc(i,j)$$

Equation 1 becomes:

$$t_r(\lambda_i, u_{ij}) = t_{r0}(\lambda_i) \cdot [1 + \alpha_i \cdot u_{ij0}(z) \cos(\Omega_{ij} t + \phi_{ij}(z))] \quad (2)$$

This is also valid for a natural vibration.

For example, of interest is the phase shift $\phi i(z)$ with respect to the excitation source $$F_{ij} = F_{ij0} \cos(\Omega_{ij} t)$$

The optical signal at output corresponds to the superposition of the responses of each optical sensor:

$$a_{out} = a_{in1} e^{-j\omega 1 t} \cdot tr(\lambda_1, u_{11}) + a_{in1} e^{-j\omega 1 t} \cdot tr(\lambda_1, u_{12}) + a_{in1} e^{-j\omega 1 t} \cdot tr(\lambda_1, u_{13}) \ldots + a_{in2} e^{-j\omega 2 t} \cdot tr(\lambda_2, u_{21}) + a_{in2} e^{-j\omega 2 t} \cdot tr(\lambda_2, u_{22}) \ldots + a_{in3} e^{-j\omega 3 t} \cdot tr(\lambda_3, u_{31}) + \ldots$$

With linearization, it is shown that the optical intensity signal at output comprises components:

$$I_{out} \propto I1 \cdot \cos(\Delta 1) \cdot [1 + \alpha_{11}(\lambda) \cos(\Omega_{11}) u_{11}(t) + \alpha_{12}(\lambda) \cos(\Omega_{12}) u_{12}(t) + \ldots] + I2 \cdot \cos(\Delta 2) \cdot [1 + \alpha_{21}(\lambda) \cos(\Omega_{21}) u_{21}(t) + \alpha_{22}(\lambda) \cos(\Omega_{22}) u_{22}(t) + \ldots] + I3 \cdot \cos(\Delta 3) \cdot [1 + \alpha_{31}(\lambda) \cos(\Omega_{31}) u_{31}(t) + \alpha_{32}(\lambda) \cos(\Omega_{32}) u_{32}(t) + \ldots] \quad (3)$$

With $\Delta i = 2 \cdot \pi \cdot fmod(i)$

Specifically, the optical waves of different wavelengths are incoherent with one another. The cross intensity terms oscillate at very high frequency and have random differences in phase: for these reasons, they have a zero average.

It can be seen in formula (3) that the information of interest uij is coded on the components of $I_{out}$ of angular frequency $\Delta i +/- \Omega ij$ (trigonometric formula for the product of cosines).

Formula (3) also shows that it is possible to position the modulation at $\Delta i$ at the output of the resonant assembly, as illustrated in FIG. 9. It is still a matter of multiplying a complex optical amplitude by a complex modulation function and by a complex transmission function of the optical resonator. The order of the operations is interchangeable.

The use of synchronous detection at the angular frequencies $\Delta i + \Omega ij$ or $\Delta i - \Omega ij$ generates a signal Sdemod(i,j) proportional to $\alpha_{ij}(\lambda) \cdot u_{ij}(t)$ (first architecture). A similar result is obtained with demodulation at $\Delta i$ followed by spectral filtering or a second demodulation at $\Omega ij$ (second, "two-stage" architecture).

The inventors have thus shown that by virtue of the linearization of the transmission functions, the signals of interest are accessible through modulation/demodulation coding/decoding according to the invention.

The use of synchronous detection makes it possible to directly extract the phase signal with a very good SNR. In the case of resonant sensors, this is often the information to be extracted.

The advantages of the measurement system according to the invention are many:

The demodulated signals Sdemod(i,j) make it possible to isolate the measurands associated with each individual photonic sensor Cij because the signals are positioned on different spectral bands.

Each wavelength "collects" information located in the photonic chip at each optical resonator.

The reading of the information from the various sensors is simultaneous.

Unlike wavelength-mux/demux, reconfiguration of the demultiplexing is straightforward:
  it is a matter of modifying the frequencies of the oscillators fmod(i) driving the modulators in the control electronics,
  judiciously choosing a set of frequencies fmod(i) ensures good separation of the signals.

For the system to function, it is necessary for the characteristic frequencies fc(i,j) to be different from one another for all instances of j of one and the same optical resonator Ri. The situation $\Delta_1 + \Omega_{11} = \Delta_2 + \Omega_{21}$ may be avoided through an appropriate choice of $\Delta_1$ and $\Delta_2$.

The principle implemented here allows the signals associated with each optical resonator to be positioned in arbitrary frequency bands that can be set apart easily when the angular frequencies $\Delta_i$ are set.

The low-pass filter of passband $BP_{LIA}$ integrated into the synchronous detection and arranged at the output of the demodulation channel i of the LIA (see following paragraphs and FIG. 11) makes it possible to eliminate the other components away from $\Delta_j - \Delta_i \gg BP_{LIAi}$.

More precisely for the demodulation channel at $\Delta i +/- \Omega ij$, it is necessary to make it so that all of the different signal components $\Delta i' +/- \Omega i'j'$ with respect to the above frequency are sufficiently far apart: typically multiple times the passband $BP_{LIA}$ of the channel in question.

This condition may be obtained very simply considering the desired measurement band. Current EOMs have working frequencies that may reach 40-100 GHz.

Synchronous detection is a well-known heterodyne signal processing technique which allows the extraction of a low-amplitude narrowband signal of known frequency in a wideband input signal Vs(t) which may be noisy. Also called coherent demodulation, it conventionally comprises a reference oscillator Oscref generating a sinusoidal reference signal Vref(t) at a frequency close to the average frequency to be detected fref, a mixer multiplying the input signal by the reference signal and an integrator which integrates the multiplied signal over a period that is much greater than that of the signal to be detected or of the input signal, so as to extract the payload signal of frequency fs=fref.

In practice it is implemented by a lock-in amplifier (LIA). The signal is amplified and multiplied by the reference (internal or external oscillator). A low-pass filter of suitable cut-off frequency performs the integration. Synchronous detection may be carried out in an analogue or digital manner.

The presence of this low-pass filter of passband $BP_{LIA}$ is essential in the multiplexing process. It is this which makes it possible to retain only certain components of the signal at output (separation of the signals for demultiplexing).

Figure 11:
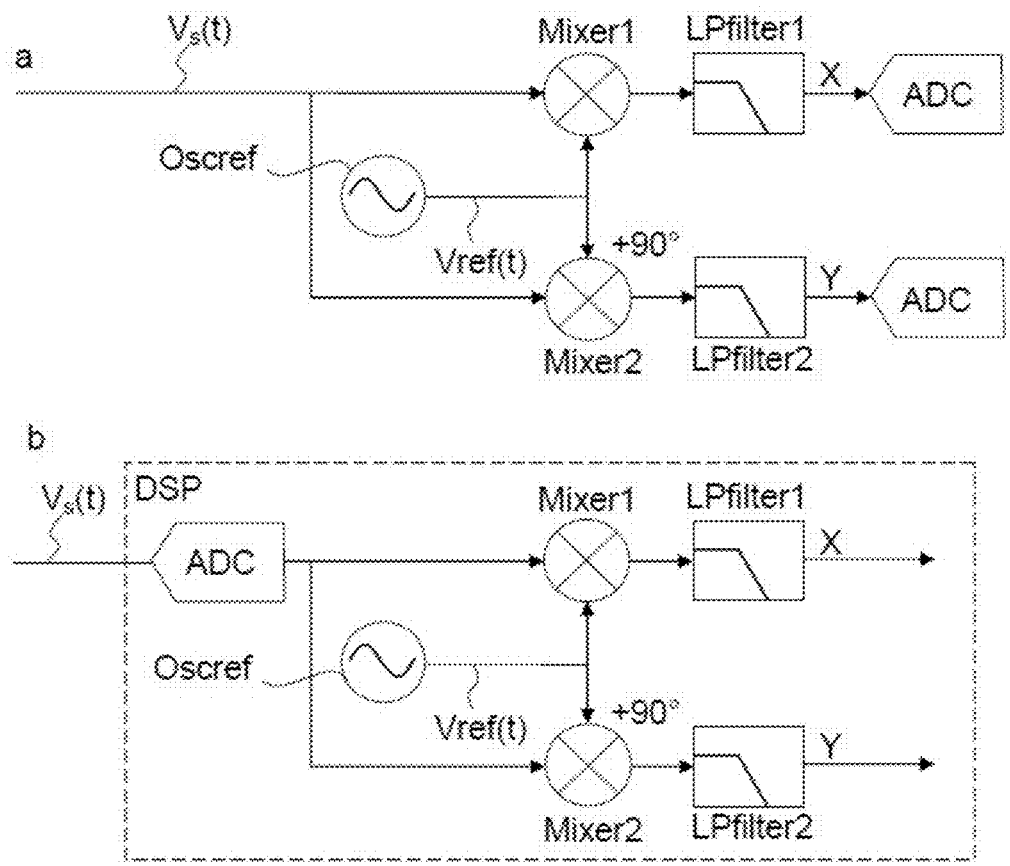
FIG. 11 illustrates one embodiment in which a coherent demodulation module comprises two channels in quadrature.

According to an improved version a coherent demodulation module or LIA 11 comprises two channels in quadrature as illustrated in FIG. 11. It comprises a reference oscillator Oscref, a first demodulation chain comprising a mixer Mixer1 and a low-pass filter LPfilter1, and a second demodulation chain (Mixer2, LPfilter2), the two signals injected into the two mixers being phase-shifted by π/2. For the analogue case (11 a) the two quadratures X and Y are digitized via ADC (analogue-to-digital converter) blocks. With digital (11 b) the input signal is digitized by an ADC block.

The amplitude and the phase of the signal sought at the frequency fref are determined from X and Y. The quadrature detection allows access to the phase and an exact calculation of the amplitude. The frequency fref, which corresponds to the frequency of the signal extracted by the coherent demodulation module 11, is referred to as the demodulation frequency.

The number of LIA demodulation modules 11 and the choice of the various modulation and demodulation frequencies depend on the type of sensors of the assembly ER and on the chosen demodulation architecture, as explained below.

At the array of sensors, according to one embodiment at least one element Eij is resonant and has a characteristic frequency fc(i,j), and according to one sub-embodiment at least one optical resonator Ri comprises a plurality of resonant elements Eij (there is at least one i for which j>1). The characteristic frequency is either a natural vibration frequency caused by the physical quantity to be measured or an external excitation frequency of the element, as explained in the prior art. The presence or absence of a characteristic frequency for the elements has consequences on the choice of the demodulation frequencies.

There is defined a passband BPc(i,j) of the sensor Eij/Ri corresponding to the signals from the sensor. It is centred around fc when fc is present and consists of an interval between 0 Hz and a frequency fmax for a sensor without a characteristic frequency.

Generally, to eliminate parasitic frequencies it is necessary for the demodulation frequency to be much (for example 10 times) higher than the passband of the low-pass filter of the LIA $BP_{LIA}$.

$$fdemod(i) > 10 \cdot BP_{LIA}$$

Additionally, to isolate the various channels well, it is necessary for the distance between two demodulation frequencies to be much (for example 10 times) greater than $BP_{LIA}$:

$$fdemod(i) - fdemod(j) > 10 \cdot BP_{LIA}$$

However, with a mechanical resonator of passband BPc, the user may accept to reduce its measurement passband to a lower level, and adjust the value of $BP_{LIA}$ to a value much greater than the above difference, which provides for excellent rejection of the parasitic signal in each detection channel.

Figure 12:
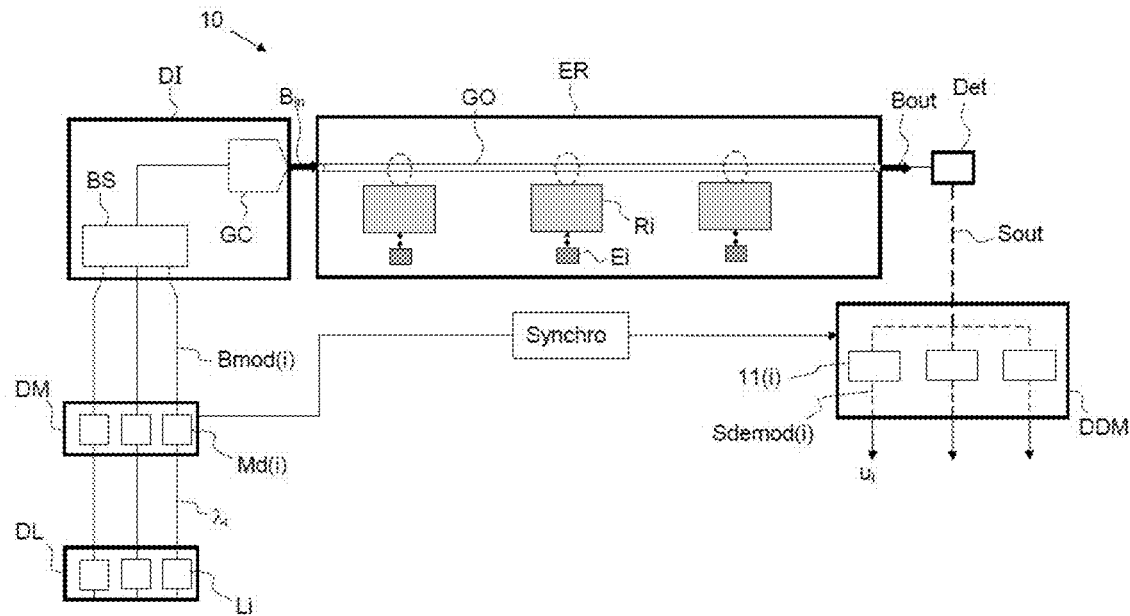
FIG. 12 illustrates a first variant of a resonant assembly in which a single element Ei is associated with each resonant assembly optical resonator, and a first demodulation architecture with one stage.

According to a first variant of a resonant assembly, illustrated in FIG. 12 for the case N=3, a single element Ei is associated with each optical resonator.

In a first case there are functionalized layers and/or mechanical elements (beams, plates, points) which are non-resonant whose degree of freedom x (x=u) is measured, as described above. In this case the demodulation device DDM comprises N LIA demodulation modules configured to perform N demodulations at the modulation frequencies fmod(i):

$$I_{out} \propto I1 \cdot \cos(\Delta 1) \cdot [1+\alpha_1(\lambda)u_1(t)] + I2 \cdot \cos(\Delta 2) \cdot [1+\alpha_2(\lambda)u_2(t)] + I3 \cdot \cos(\Delta 3) \cdot [1+\alpha_3(\lambda)u_3(t)] + \ldots$$

The reference oscillator of each channel i Oscref(i) for the generation of the demodulation frequency is preferably shared with the modulation, to ensure coherence between modulation and demodulation and avoid phase drift overtime Oscs(i)=Oscref(i). Thus, the demodulation frequency is synthesized based on the modulation frequency, which is illustrated by the Synchro block in FIG. 12.

Generically, it is considered that a frequency is generated from an oscillator. The demodulation frequency is therefore generated from the source oscillator generating the modulation frequency.

Generically, when the demodulation processing is digital, one and the same synthesis clock is preferably used to synchronize the various oscillators (modulation and demodulation).

In a second case at least one element Ei is resonant at a characteristic frequency fc(i). The element may be merged with the optical resonator (see prior art).

Formula (3) takes the form:

$$I_{out} \propto I1 \cdot \cos(\Delta 1) \cdot [1+\alpha_1(\lambda)\cos(\Omega_1)u_1(t)] + I2 \cdot \cos(\Delta 2) \cdot [1+\alpha_2(\lambda)\cos(\Omega_2)u_2(t)] + I3 \cdot \cos(\Delta 3) \cdot [1+\alpha_3(\lambda)\cos(\Omega_3)u_3(t)]$$

According to a first embodiment, the demodulation device DDM comprises N LIA demodulation modules configured to perform, respectively, N demodulations at the frequencies fdemod(i) equal to fmod(i)+/−fc(i) when fc(i) is present, and at the frequencies fmod(i) otherwise. The demodulation frequency is chosen: either fmod(i)+fc(i) or fmod(i)−fc(i) (in absolute value). This is called the "one-stage" architecture.

It may be advantageous in some cases to prefer a low-frequency signal conditioning chain: lower power consumption, better SNR for the photodiodes for example. In this scenario, the demodulation frequency of smallest absolute value may be chosen. For that, fmod will be chosen such that fmod−fc is in the passband of the conditioning chain. What is meant by "conditioning chain" is all of the processing chain between detection and determination of the desired quantity.

Preferably, when the characteristic frequency fc is an excitation frequency fex, the demodulation frequency is synthesized based on the source oscillator generating the modulation frequency, and based on an excitation oscillator generating the associated excitation frequency. When the characteristic frequency is a natural vibration, according to one embodiment the natural frequency to be measured is detected (tracked) and used to synthesize the demodulation frequency, together with the modulation frequency.

In this architecture with one stage, care is taken that $BP_{LIA}$ is always smaller than or equal to BPc. If $BP_{LIA}$ is greater, it is the sensor itself which imposes the passband.

Figure 13:
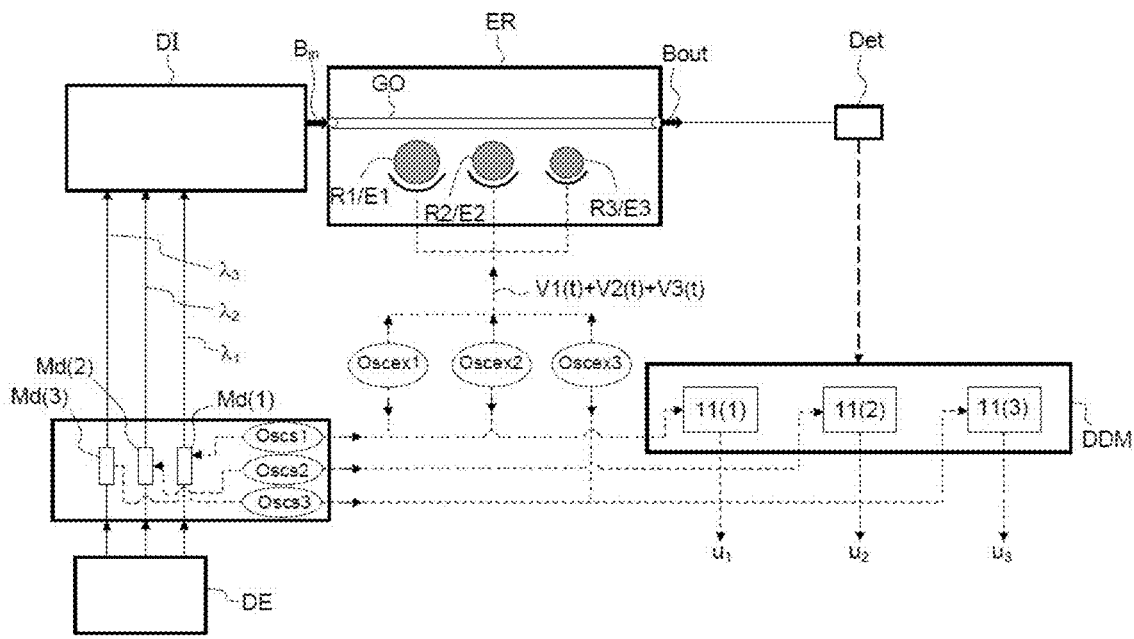
FIG. 13 illustrates the example of a resonant assembly comprising 3 discs forming both the optical resonator and the mechanical resonator.

FIG. 13 illustrates the example of a resonant assembly comprising 3 discs forming both the optical resonator and the mechanical resonator. The three discs are excited at the frequencies fex(1), fex(2) and fex(3), respectively, generated by 3 oscillators Oscex1, Oscex2, Oscex3, respectively. The three excitation frequencies are in the mechanical spectral bands BPm1, BP2m, BP3m around the mechanical resonance frequencies frm1, frm2, frm3, respectively. The signals V1(t), V2(t) and V3(t) from the oscillators are conveyed over one and the same bus and injected at the three discs, each disc acting as a filter and reacting only to its own resonance. The modulation frequencies fmod(1), fmod(2) and fmod(3) are generated by three source oscillators Oscs1, Oscs2, Oscs3, respectively. The demodulation frequency fdemod(i)=fmod(i)+/−fex(i) is synthesized based on the two signals from the two oscillators Oscsi and Oscexi.

The modulation frequencies are typically chosen between a few KHz and a few GHz.

Take the example of two beams at λ1, λ2 modulated respectively at the frequencies fmod(1) and fmod(2), associated with two optical resonators R1 and R2. The two sensors R1/E1 and R2/E2 have respective excitation frequencies fex(1)=100 MHz and fex(2)=101 MHz and mechanical resonance passbands that are substantially identical BPm1,2=10 kHz. The passband of the sensor BPc is limited by the mechanical passband BPm. In practice BPc≤BPm. BPc=BPm is taken.

The modulation frequencies fmod(1)=99 MHz and fmod(2)=99.5 MHz are chosen, which leads to demodulation frequencies:

$f\text{demod}(1)=f\text{mod}(1)-f\text{ex}(1)=100 \text{ MHz}-99 \text{ MHz}=1 \text{ MHz}$ $f\text{demod}(2)=f\text{mod}(2)-f\text{ex}(2)=101 \text{ MHz}-99.5 \text{ Mz}=1.5 \text{ MHz}$ $BP_{LIA}$=BPc=10 kHz may be taken. Taking a higher passband $BP_{LIA}$ is of little interest because the sensor is itself limited to 10 kHz.

Figure 14:
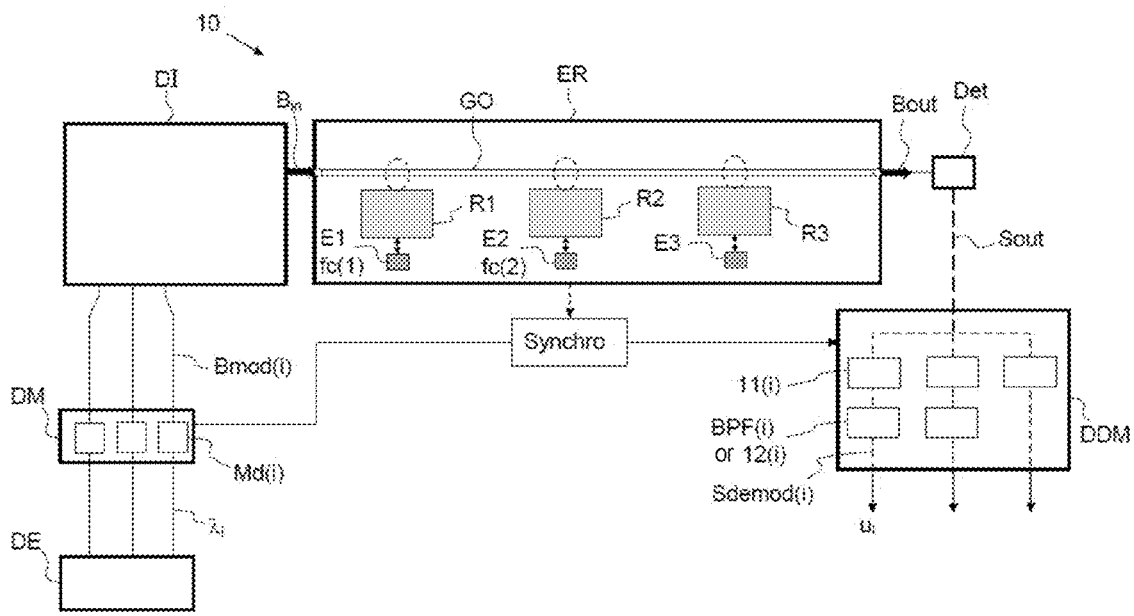
FIG. 14 illustrates the first variant of a resonant assembly in which certain elements are resonant with characteristic frequencies, and a second, "two-stage" demodulation architecture.

In the case for which at least one element Ei is resonant at a characteristic frequency fc(i), according to a second, "two-stage" embodiment, illustrated in FIG. 14 for N=3, the demodulation device DDM comprises a first stage of N LIA demodulation modules (11) configured to perform, respectively, N demodulations at the frequencies fdemod(i)=fmod(i), and a second stage.

The second stage comprises:
either spectral filters BPF(i) configured to perform, for each channel i for which the frequency fc(i) is present, spectral filtering around fc(i) to extract the associated characteristic signal,
or LIA demodulators 12(i) at the frequencies fc(i). In this case the synchronization Synchro from DM to DDM also integrates information from the frequencies fc(i).

The choice between spectral filters and LIA demodulators depends on the signal that is sought. If it is a time envelope, spectral filters are sufficient, if precise information on the amplitude and phase of the signal is sought, LIA demodulators must be used.

In the example of FIG. 14 the resonators R1 and R2 each have an element E1, E2, of respective characteristic frequency fc(1) and fc(2), and the resonator R3 has no characteristic frequency. The channels 1 and 2 respectively comprise a filter BPF(1) and BPF(2) and not the channel 3. Specifically, for this channel 3 the signal from E3 has already been filtered by the LIA demodulator 11(3) of the first stage. A low-pass filter may optionally be inserted after 11(3) to improve filtering.

One advantage of this two-stage device is that the reference oscillator is synchronized to the source oscillator only. The reference oscillator used for demodulation is under these conditions perfectly coherent with the signal to be analysed. Demodulation is thus carried out without phase error or phase drift.

The modulation frequencies are typically chosen between a few tens of KHz and a few GHz.

This time, a $BP_{LIA}$ is preferably chosen such that:

$BP_{LIA}>fc+BPc$

Specifically, $BP_{LIA}$ has to let through all of the signals of the sensors and therefore has to contain the entire spectrum of the sensor signal from 0 Hz. This condition is more restrictive than for the architecture with one stage.

Take the example of two beams at λ1, λ2 associated with two optical resonators R1 and R2 of modulation frequency fmod(1) and fmod(2). There is just one element per sensor. The two sensors R1/E1 and R2/E2 have respective excitation frequencies fex(1)=10 MHz and fex(2)=11 MHz and mechanical resonance passbands that are substantially identical BPm1,2=10 kHz.

The modulation/demodulation frequencies and a passband of LIA $BP_{LIA}$ of 20 MHz are chosen:

$f\text{mod}(1)=1 \text{ GHz}; f\text{mod}(2)=1.5 \text{ GHz}$,

This architecture requires higher modulation frequencies than for the preceding case: it must be higher than fc and preferably 10×fc:

$f\text{mod}>10\cdot fc$

In the preceding case there is no such condition.

According to a second variant of a resonant assembly, at least one optical resonator comprises a plurality of associated elements Eij including resonant elements. A resonator Ri comprising Mi associated elements and the resonant assembly ER comprises a total of M elements Eij.

These elements are for example beams or plates. When multiple elements are associated with the same resonator, it is necessary for each element to have a different characteristic frequency to be able to be discriminated from the other elements of the same resonator.

According to a first embodiment, with one stage, the demodulation device comprises M LIA demodulation modules configured to perform, respectively, M demodulations at the frequencies fmod(i)+/−fc(i,j) when fc(i,j) is present, and at the frequencies fmod(i) otherwise. The advantage is that this architecture comprises just one stage, the information being obtained through a single processing operation. The constraint in the choice of the modulation frequencies is that it should preferably be higher than 10 times the passband of the sensor.

Figure 15:
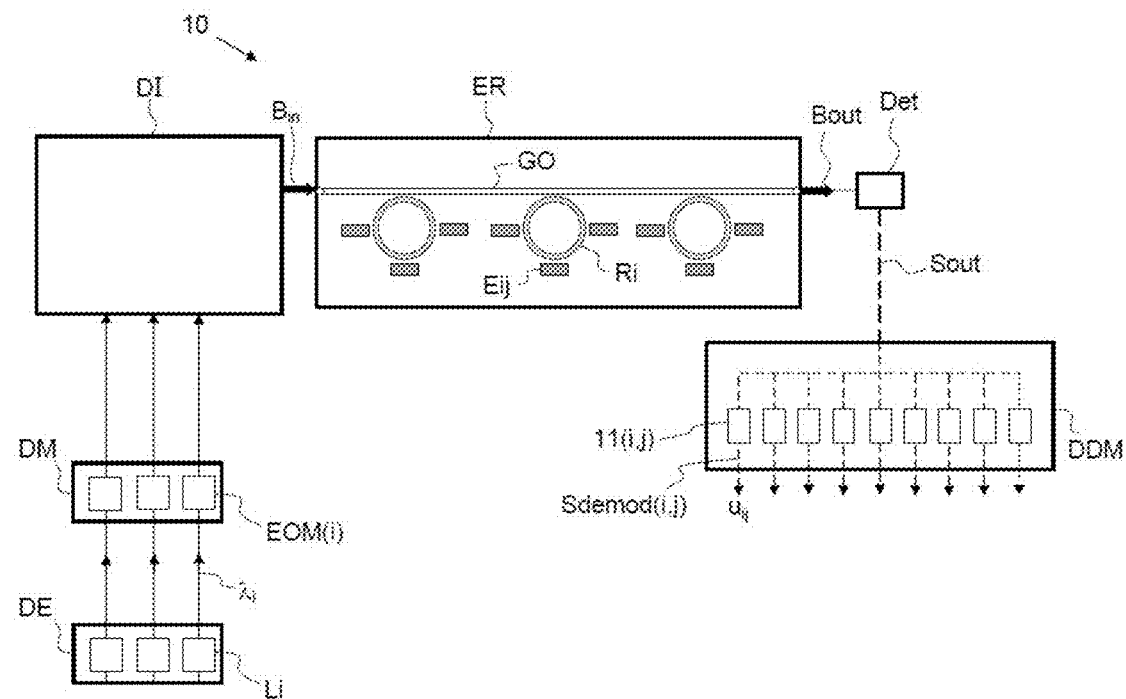
FIG. 15 illustrates a second variant of a resonant assembly in which at least one optical resonator comprises a plurality of associated resonant elements Eij, and illustrates a demodulation architecture with one stage in which the demodulation device comprises M LIA demodulation modules configured to perform, respectively, M demodulations at the frequencies fmod(i)+/−fc(i,j) when fc(i,j) is present, and at the frequencies fmod(i) otherwise.

FIG. 15 illustrates this first embodiment for the case N=3 and Mi=3 for all of the resonators Ri, with M=9. In this case, the demodulation device comprises 9 LIA demodulators 11(i,j).

Figure 16:
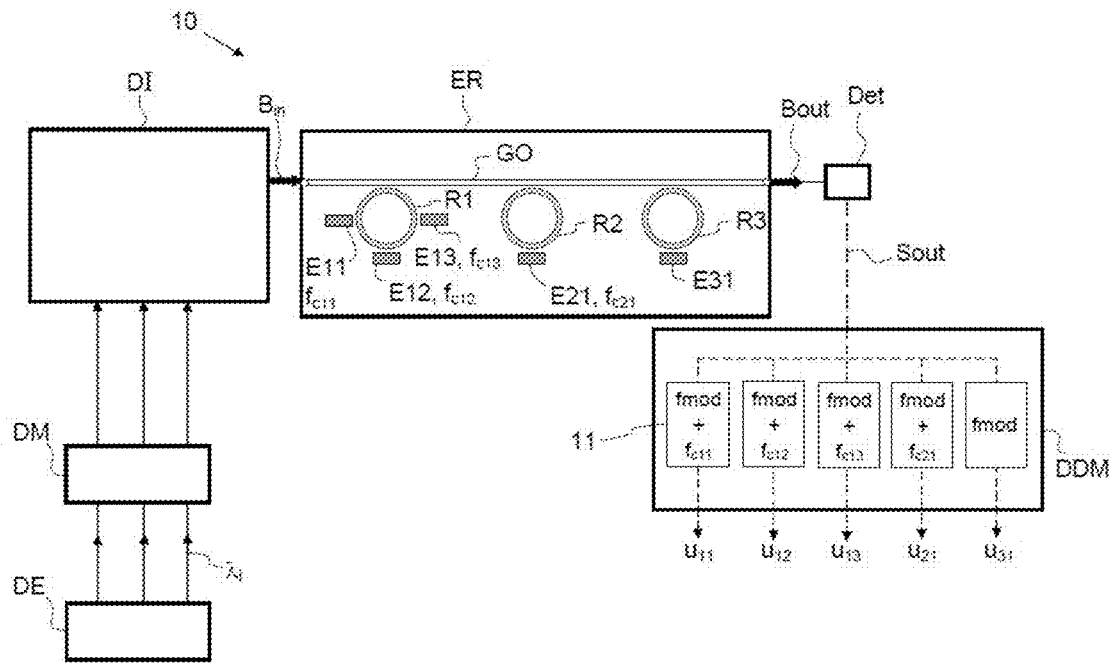
FIG. 16 illustrates the second variant of a resonant assembly and an architecture with one stage, for a mixed case with N=3: R1 comprises 3 resonant elements E11, E12, and E13; R2 comprises a single resonant element E21; R3 comprises a non-resonant element E31.

FIG. 16 illustrates this first embodiment for a mixed case with N=3 in which the first resonator R1 comprises 3 resonant elements E11, E12, and E13, the second resonator R2 comprises a single resonant element E21, and the third resonator R3 comprises a non-resonant element E31. In this case the demodulation device DDM comprises 5 LIA demodulators at the demodulation frequencies: fmod+fc11, fmod+fc12, fmod+fc13, fmod+fc21, fmod, respectively.

The choice of the various parameters obeys the same conditions as explained above for the case with one stage of the first variant.

This architecture with one stage is preferred when it is desired to measure the amplitude and the phase of the signal of the sensor.

According to a second embodiment applied to the second variant of a resonant assembly, the demodulation device DDM comprises a first stage comprising N LIA demodulation modules configured to perform, respectively, N demodulations at the frequencies fmod(i) and comprises, for each channel i for which at least one characteristic frequency is present, a second stage.

One advantage is, for high-frequency (GHz for example) demodulation, of performing only N high-frequency demodulations, with a second stage dedicated to low-frequency modules. There is thus a smaller number of high-frequency demodulations than for the case with just one single stage.

According to a first option the second stage comprises LIA demodulation modules 12 at the characteristic frequencies fc(i,j). For the non-resonant elements a low-pass filter is used.

According to a second option the second stage comprises spectral filters BPF configured to perform spectral filtering around the characteristic frequency fc(i,j). Likewise for the non-resonant elements a low-pass filter is used.

Here too the choice between the two options depends on the signal to be extracted (see above).

Figure 17:
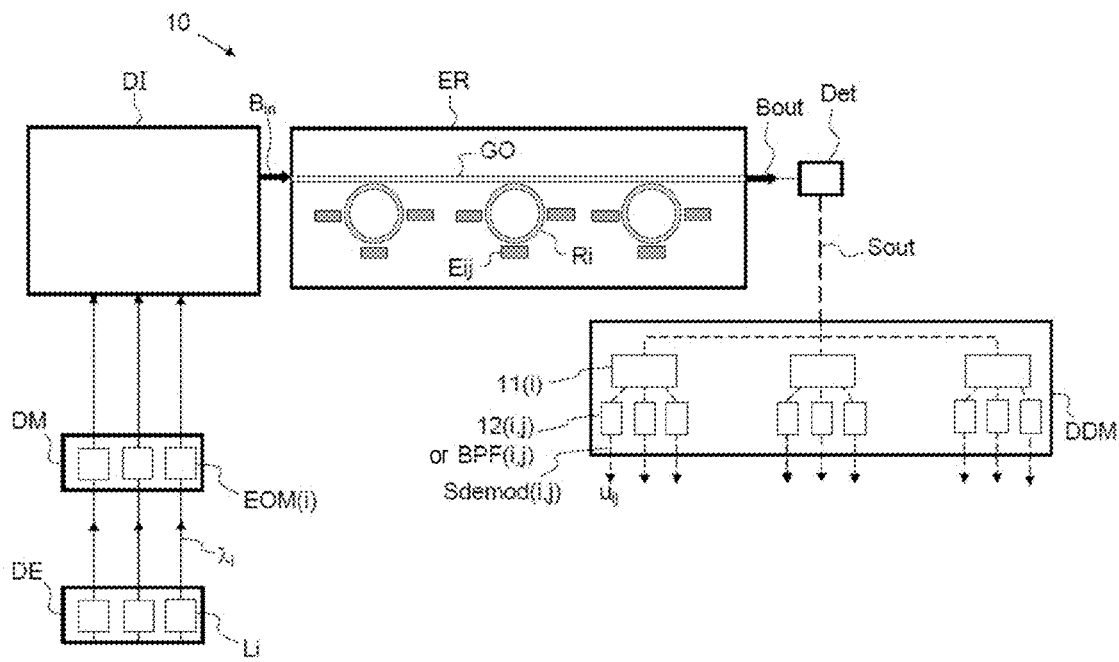
FIG. 17 illustrates the second variant of a resonant assembly and an architecture with two stages. The demodulation device DDM comprises a first stage comprising N LIA demodulation modules configured to perform, respectively, N demodulations at the frequencies fmod(i) and comprises, for each channel i for which at least one characteristic frequency is present, a second stage of LIA demodulation modules at the characteristic frequencies fc(i,j) (when they are present) or of spectral filters BPF configured to perform spectral filtering around the characteristic frequency fc(i,j). A low-pass filter is used for the sensors without a characteristic frequency.

FIG. 17 illustrates the case of N=3 with Mi=3 for all i. There is a first stage of 3 LIA demodulators 11(1), 11(2), 11(3) at the respective frequencies fmod(1), fmod(2) and fmod(3) and a second stage which comprises 9 LIA demodulators or 9 spectral filters, 3 (Mi) per resonator Ri.

Figure 18:
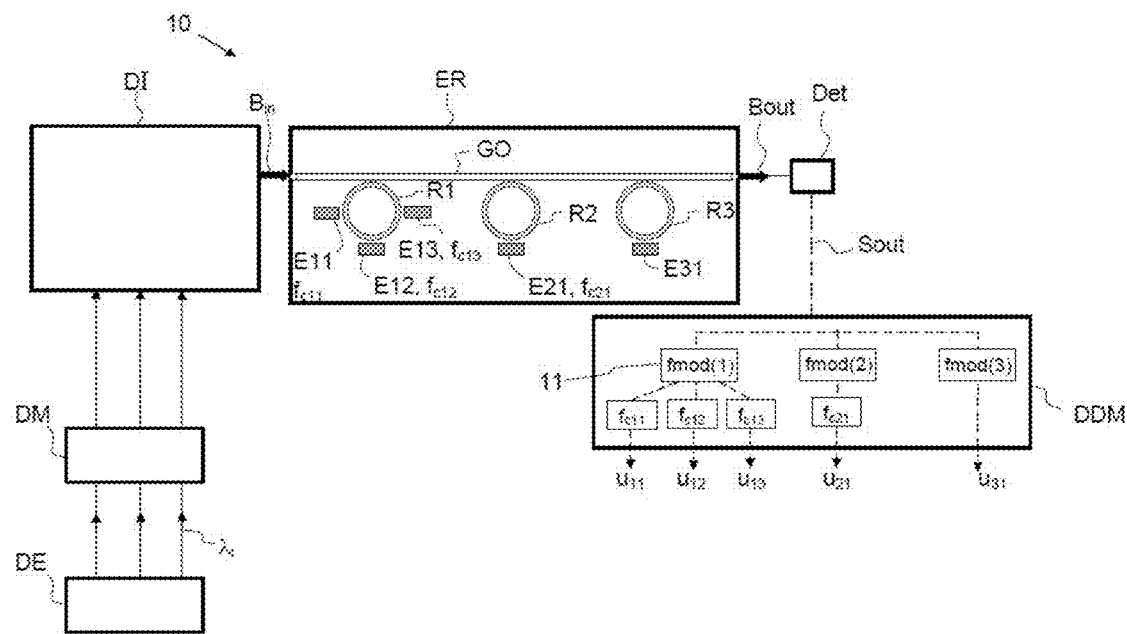
FIG. 18 illustrates the mixed resonant assembly of FIG. 16 and a demodulation architecture with two stages. There are 3 LIA demodulators for the first stage, and for the second stage: channel 1: either 3 LIA demodulators at fc11, fc12, fc13, or three spectral filters centred on these frequencies; channel 2: a spectral filter at fc21; channel 3: no second stage (a low-pass filter is optional).

FIG. 18 illustrates the mixed assembly ER described above and a demodulation architecture with two stages. In this case there are still the 3 LIA demodulators for the first stage, and for the second stage:
for the resonator R1: either 3 LIA demodulators at fc11, fc12, fc13, or three spectral filters centred on these frequencies
for the resonator R2: either an LIA demodulator at fc21 or a spectral filter centred on fc21.
no second stage for the resonator R3. However, if the resonator R3 comprised, in addition to the element without a characteristic frequency, another element E32 with a characteristic frequency, it would be necessary to insert a second stage comprising a low-pass filter to extract the signal of the sensor E31/R3, and a bandpass filter or an LIA demodulator to extract the signal of the sensor E32/R3.

The advantage of the two-stage architecture is that the demodulation of the first stage is performed at the frequencies fmod(i). Generation of the demodulation frequency is simplified because it is equal to the modulation frequency, the two frequencies fmod(i) and fdemod(i) being synthesized based on the same source oscillator.

The choice of the various parameters obeys the same conditions as explained above for the two-stage case of the first variant, and it is therefore necessary to choose modulation frequencies that are quite high to ensure effective filtering between channels.

For example, consider the case of two resonators R1 and R2 and sensors R1/E11, R1/E12, R2/E21 and R2/E22. There is: fex(11)=5 MHz, fex(12)=6 MHz, fex(21)=5 MHz and fex(22)=0 Hz. It is assumed that the passbands of the sensors BPc are all at 10 kHz. It is possible to take fmod(1)=100 MHz and fmod(2)=200 MHz and LIA filters of $BP_{LIA}$=10 MHz.

The demodulator 11(1) at fdemod=100 MHz makes it possible to isolate the signals of R1/E11 and R1/E12, both situated at 5 and 6 MHz. A second stage then makes it possible to extract, or more precisely to separate, the amplitude and the phase with LIA modules or the waveform with bandpass filters: the filtering width may possibly be chosen at 10 kHz or below. The demodulator 11(2) does the same thing for the signals at 5 MHz and 0 Hz.

In summary:
The resonant assembly according to the invention comprises, where applicable, at least one resonant element having a characteristic frequency, and, where applicable, at least one optical resonator comprising multiple associated elements.

The demodulation device according to the invention has two alternative architectures:
a first architecture comprising M LIA demodulators at the frequencies fmod(i)+/−fc(i,j) when fc(i,j) is present, fmod(i) otherwise,
a second architecture with:
a first stage comprising N LIA demodulators at the frequencies fmod(i) and
a second stage comprising, per channel i comprising at least one sensor having a characteristic frequency, Mi LIA demodulators or Mi spectral filters at the frequencies fc(i,j). For an element without a characteristic frequency, a low-pass filter is used.

Preferably the demodulation frequency is generated, i.e. synthesized, based on the modulation frequency and, where applicable, based on the characteristic frequencies, whether applied or measured.

Figure 19:
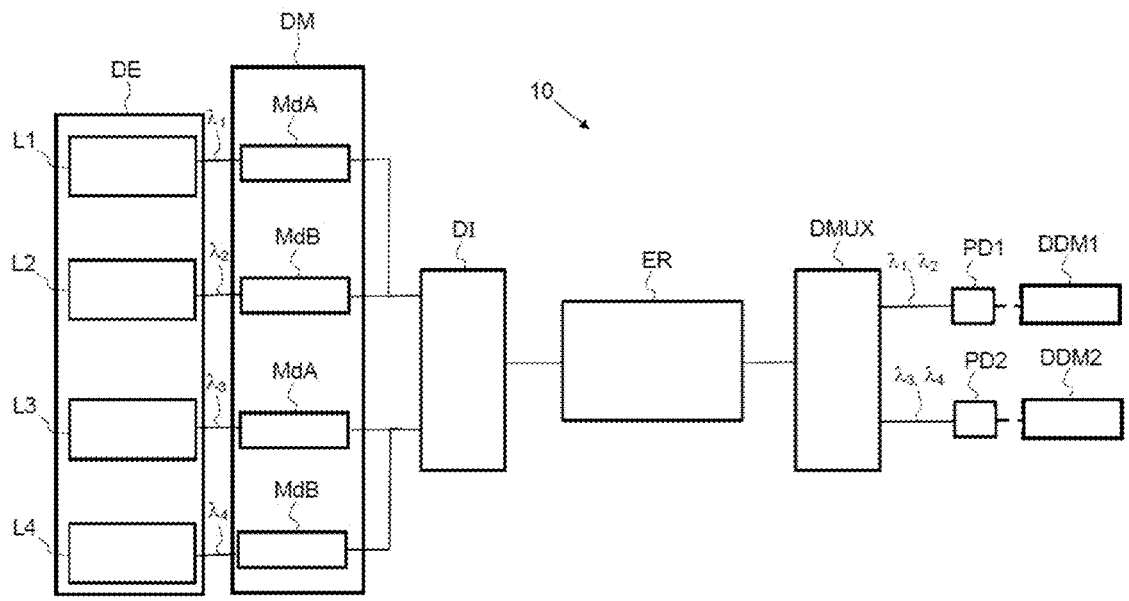
FIG. 19 illustrates one embodiment of the measurement system according to the invention, in which the measurement system is combined with a wavelength-multiplexing/demultiplexing device.

According to one embodiment the measurement system according to the invention is combined with a wavelength-demultiplexing device, as illustrated in FIG. 19. This makes it possible to lift the constraint of having modulation frequencies that are all different.

The lasers L1 and L3 are modulated, via a respective modulator MdA, at the same frequency fmodA, like the lasers L2 and L4 are modulated, via MdB, at the same frequency fmodB. The injection device superposes all of the beams and injects them into the resonant assembly ER. At output a demultiplexer component DMUX is added, which separates the beams at λ1 and λ2 which are detected by PD1 on the one hand and the beams at λ3 and λ4 which are detected by PD2 on the other hand. Each detector PD1, PD2 is coupled to the demodulation device DDM1, DDM2, respectively. The processing of the signals carried by λ1 and λ2 is performed independently of the processing of the signals carried by λ3 and λ4.

In addition, it is possible to reach a large number of channels in the system.

According to another aspect, the invention relates to a method for measuring a physical quantity u comprising the steps of:
A emitting a plurality of N light beams each having an emission wavelength λi,
B modulate each of the light beams at a modulation frequency fmod(i),
C superpose the N light beams to form an input beam Bin and to inject the beam as input to the resonant assembly ER, the resonant assembly ER comprising:
an input E and an output S,
a plurality of N optical resonators Ri indexed i each having a resonance wavelength λr,i, the wavelengths λi being in the resonance band of the associated optical resonator Ri,
at least one waveguide GO to which the optical resonators are coupled,
at least one element Ei, Eij positioned close to each resonator Ri,
D modifying an optical transmission or reflection close to the resonance of each optical resonator, said modification being dependent on the physical quantity u to be measured,
E detecting a light beam at the output of the resonant assembly and generating an output signal,
F synchronously demodulating the output signal, based on at least N synchronous-detection demodulation modules, so as to extract characteristic signals Sdemod(i,j) associated with each element, measured values (uij) of said physical quantity being determined from the characteristic signals.

The invention claimed is:

1. A MEMs or NEMs measurement system comprising:
a resonant assembly comprising:
an input and an output,
a plurality of N optical resonators Ri indexed i each having a resonance wavelength λr,i,
at least one waveguide to which the optical resonators are coupled,
at least one element coupled to each resonator Ri and configured to modify an optical transmission or reflection as a function of wavelength, for wavelengths close to the resonance wavelength λr,i of said optical resonator Ri, said modification being dependent on a physical quantity to be measured,
an emission device configured to emit a plurality of N light beams indexed i, each having an emission wavelength λi indexed i in the resonance band of the associated optical resonator Ri indexed i,
a modulation device configured to modulate each of the N light beams indexed i, at an associated modulation frequency fmod(i), indexed i, generating N modulated light beams,
an injection device configured to superpose the N modulated light beams to form an input beam and to inject the input beam as input to the resonant assembly, the modulation device being arranged upstream of the injection device,
at least one detector configured to detect an output light beam at the output of the resonant assembly and to generate an output signal,
a demodulation device comprising at least N synchronous-detection demodulation modules, denoted LIA, to demodulate the output signal, so as to extract characteristic signals associated with each element and the measured values (uij, zij) of said physical quantity being measured from said characteristic signals.

2. The measurement system according to claim 1, wherein the emission device comprises N lasers and the modulation device comprises N modulators arranged respectively on the optical paths of the N light beams emitted by the N lasers, each modulator being configured to modulate each of the N light beams indexed i at the associated modulation frequency fmod(i).

3. The measurement system according to claim 2, wherein the modulators are electro-optical modulators.

4. The measurement system according to claim 1, wherein the emission device and the modulation device form one and the same device comprising N intensity-modulated lasers.

5. The measurement system according to claim 1, wherein an LIA demodulation module comprises a reference oscillator at a demodulation frequency and a first demodulation chain comprising a mixer and a low-pass filter.

6. The measurement system according to claim 5, wherein an LIA demodulation module comprises a second demodulation chain in quadrature with the first chain.

7. The system according to claim 1, wherein each optical resonator of the plurality of N optical resonators is chosen from among: a disc, a guide looping back on itself, and a photonic crystal.

8. The measurement system according to claim 1, wherein the at least one element is a single element associated with each optical resonator and in which the demodulation device comprises N LIA demodulation modules configured to perform N demodulations at said modulation frequencies fmod (i).

9. The measurement system according to claim 1, wherein the at least one element is resonant and has a characteristic frequency fc(i,j) in a resonance band of the resonant element, j being the index of the element associated with the resonator Ri.

10. The measurement system according to claim 9, wherein the at least one element is a single element associated with each optical resonator and in which the demodulation device comprises N LIA demodulation modules configured to perform, respectively, N demodulations at the frequencies fmod(i)+/−fc(i) when fc(i) is present and at the frequencies fmod(i) otherwise.

11. The measurement system according to claim 9, wherein the at least one element is a single element associated with each optical resonator and in which the demodulation device comprises:
a first stage of N LIA demodulation modules configured to perform, respectively, N demodulations at the frequencies fmod(i), and a second stage comprising either spectral filters configured to perform, for each channel i for which the frequency fc(i) is present, a spectral filtering around fc(i) to extract the associated characteristic signal; or
LIA demodulators at the frequencies fc(i).

12. The measurement system according to claim 11, wherein the single element is merged with each optical resonator.

13. The measurement system according to claim 9, wherein at least one optical resonator comprises a plurality of associated elements Eij comprising resonant elements, a resonator Ri comprising Mi associated elements, the resonant assembly comprising a total of M elements.

14. The system according to the claim 13, wherein the demodulation device comprises M LIA demodulation modules configured to perform, respectively, M demodulations at the frequencies fmod(i)+/−fc(i,j) when fc(i,j) is present and at the frequencies fmod(i) otherwise.

15. The measurement system according to claim 13, wherein the demodulation device comprises a first stage comprising N LIA demodulation modules configured to perform, respectively, N demodulations at the frequencies fmod(i) and comprises, for each channel i for which at least one characteristic frequency is present, a second stage comprising LIA demodulation modules at the characteristic frequencies fc(i,j).

16. The measurement system according to claim 13, wherein the demodulation device comprises a first stage comprising N LIA demodulation modules configured to perform, respectively, N demodulations at the frequencies fmod(i) and comprises, for each channel i for which at least one characteristic frequency is present, a second stage comprising spectral filters configured to perform spectral filtering around the characteristic frequency fc(i,j).

17. The measurement system according to claim 9, wherein the characteristic frequency is a natural vibration frequency caused by the physical quantity to be measured.

18. The measurement system according to claim 9, wherein the characteristic frequency is an external excitation frequency of said element.

19. A method for measuring a physical quantity comprising the steps of:
A emitting a plurality of N light beams each having an emission wavelength λi,
B modulating each of the N light beams indexed i, at an associated modulation frequency fmod(i), indexed i, generating N modulated light beams, C superposing the N modulated light beams to form an input beam and to inject the input beam as input to the resonant assembly, the modulation device being arranged upstream of the injection device, the resonant assembly comprising:

an input and an output, a plurality of N optical resonators Ri indexed i each having a resonance wavelength λr,i, the wavelength λi being in the resonance band of the associated optical resonator Ri, at least one waveguide to which the optical resonators are coupled, at least one element coupled to each resonator Ri, D modifying an optical transmission or reflection as a function of wavelength, for wavelengths close to the resonance wavelength λr,i of each optical resonator Ri, said modification being dependent on the physical quantity to be measured, E detecting a light beam at the output of the resonant assembly and generating an output signal, F synchronously demodulating the output signal, based on at least N synchronous-detection demodulation modules, so as to extract characteristic signals associated with each element and the measured values of said physical quantity being measured from the characteristic signals.

20. A MEMs or NEMs measurement system comprising:

a resonant assembly comprising:

an input and an output, a plurality of N optical resonators Ri indexed i each having a resonance wavelength λr,i, at least one waveguide to which the optical resonators are coupled, at least one element coupled to each resonator Ri and configured to modify an optical transmission or reflection as a function of wavelength, for wavelengths close to the resonance wavelength λr,i of said optical resonator Ri, said modification being dependent on a physical quantity to be measured, an emission device configured to emit a plurality of N light beams indexed i, each having an emission wavelength λi indexed i in the resonance band of the associated optical resonator Ri indexed i, an injection device configured to superpose the N light beams to form an input beam and to inject the input beam as input to the resonant assembly, a modulation device, arranged downstream of an output of the resonant assembly, and configured to modulate each of the N light beams indexed i, having an emission wavelength λi indexed i, a at an associated modulation frequency fmod (i) indexed i, generating N modulated light beams, at least one detector configured to detect an output light beam at an output of the modulation device and to generate an output signal, a demodulation device comprising at least N synchronous-detection demodulation modules, denoted LIA, to demodulate the output signal, so as to extract characteristic signals associated with each element, measured values of said physical quantity being measured from said characteristic signals.

* * * * *